United States Patent

[11] 3,593,333

[72] Inventor Richard K. Oswald
San Jose, Calif.

[21] Appl. No 880,274
[22] Filed Nov. 26, 1969
[45] Patented July 13, 1971

[73] Assignee International Business Machines Corporation
Armonk, N.Y.

[54] POSITION DETECTION FOR A TRACK FOLLOWING SERVO SYSTEM
3 Claims, 4 Drawing Figs.

[52] U.S. Cl. .......... 340/174.1
B, 179/100.2 MI, 179/100.2 S
[51] Int. Cl. .......... G11b 21/10
[50] Field of Search .......... 340/174.1
B; 179/100.2 S

[56] References Cited
UNITED STATES PATENTS

| | | | |
|---|---|---|---|
| 3,404,392 | 10/1968 | Soroello | 340/174.1 |
| 3,430,215 | 2/1969 | Krossa et al. | 340/174.1 |

*Primary Examiner*—Bernard Konick
*Assistant Examiner*—Vincent P. Canney
*Attorneys*—Hanifin and Jancin and Edward M. Suden

ABSTRACT: The invention relates to the positioning of a transducer relative to a desired information track on a magnetic disc. Alternate reference tracks on the disc are 90° out of phase with each other. Position error detection circuitry derives an error position signal and an automatic gain signal simultaneously from the signal induced in the transducer as a function of its position relative to the reference tracks on the disc. The automatic gain signal is provided even when the transducer is properly placed and allows for more accurate error position signals to be generated by the position error detection circuitry.

INVENTOR
RICHARD K. OSWALD

BY Edward M. Suder

AGENT

POSITION DETECTION FOR A TRACK FOLLOWING SERVO SYSTEM

BACKGROUND OF THE INVENTION

1. Field of the Invention

This invention relates to information recording and reproducing systems, and more particularly to random access memory systems which require the accurate positioning of a transducer relative to the information to be recorded or reproduced.

2. Prior Art

In the art of data processing, recourse is frequently made to systems separated from the central computer for the storage of large quantities of data. At least one of these storage systems have taken the form of one or more magnetizable rotating discs to which random access may be had by a transducer for the recording or reproduction of information. Random access storage systems are desirable because immediate access of the information can be had without having to wait for a complete cycling through the information until the desired information is reached.

Information to be recorded or reproduced is located on the rotating magnetizable disc in an orderly fashion so that accurate and rapid access may be had to the information contained thereon. The information is placed serially on a plurality of concentric tracks. So that as much information may be recorded as possible on the disc area, not only are the individual binary bit recorded as closely together as possible in a particular track, but also individual tracks on the disc are placed as close together as possible.

In order to obtain random access to the information contained on the plurality of concentric tracks, accurate means must be provided for positioning a recording or reproducing transducer precisely on the center of a desired one of the many concentric tracks. Assuming that a transducer can be positioned in the vicinity of a desired track, the further problem remains of precisely centering the transducer with respect to the desired track.

Further, in a random-access disc system, means are provided for moving the same reproducing head into alignment with each recording track, selectively, so that the same head can reproduce data stored in any of the numerous recording tracks. A difficulty arises from the fact that the several recording tracks on a disc move at different linear velocities, and the amplitude of the electric signals produced by the transducer is approximately proportional to the linear velocity of the recording track. Consequently, when the reproducing head is aligned with the innermost recording track on a disc, the electrical pulses supplied by the transducer responsive to reversals in magnetic polarity on the record have about one-half the amplitude that the pulses supplied by the transducer have when the reproducing head is aligned with the outermost track of the same disc. Furthermore, the reproduction of recorded signals is always accompanied by a certain amount of electrical noise.

Therefore, an object of this invention is to provide a position controlled system which will accurately maintain a transducer relative to a predetermined track of recorded information.

Another object of the invention is to provide a position controlled system incorporating automatic gain control means so as to provide an accurate position error signal for accurately maintaining the position of a transducer relative to a predetermined track of recorded information.

SUMMARY OF THE INVENTION

Briefly, the invention relates to the positioning of a transducer relative to a desired information track on a magnetic disc. When the transducer is accurately positioned, the path transcribed by the transducer relative to the movable medium will be on a path coinciding with the center of the transducer and the center line of the track. At predetermined intervals along the magnetic disc, reference patterns are recorded. These reference patterns consist of a plurality of reference tracks, where the boundary between two adjacent reference tracks coincides with the center line of a data track. Each reference track consists of a series of signal-inducing areas occurring at a fixed frequency. Alternating reference tracks have the series of signal-inducing areas offset by 90° from the signal-inducing areas of the adjacent tracks. A sync clock means provides sync clock pulses whenever the area of the disc passing under the transducer is associated with the reference patterns. The amplitude of the readhead signal is controlled by a variable gain amplifier. Means is provided for generating a position error signal from the readhead signal and the sync clock pulses for positioning the transducer along the center line of the desired data track. A further means is provided for obtaining an amplitude signal which is used to obtain an automatic gain control signal for controlling the gain of the variable gain amplifier.

The foregoing and other objects, features and advantages of the invention will be apparent from the following more particular description of the preferred embodiment of the invention as illustrated in the accompanying drawings.

DETAILED DESCRIPTION OF THE PREFERRED EMBODIMENT

Figure 1:
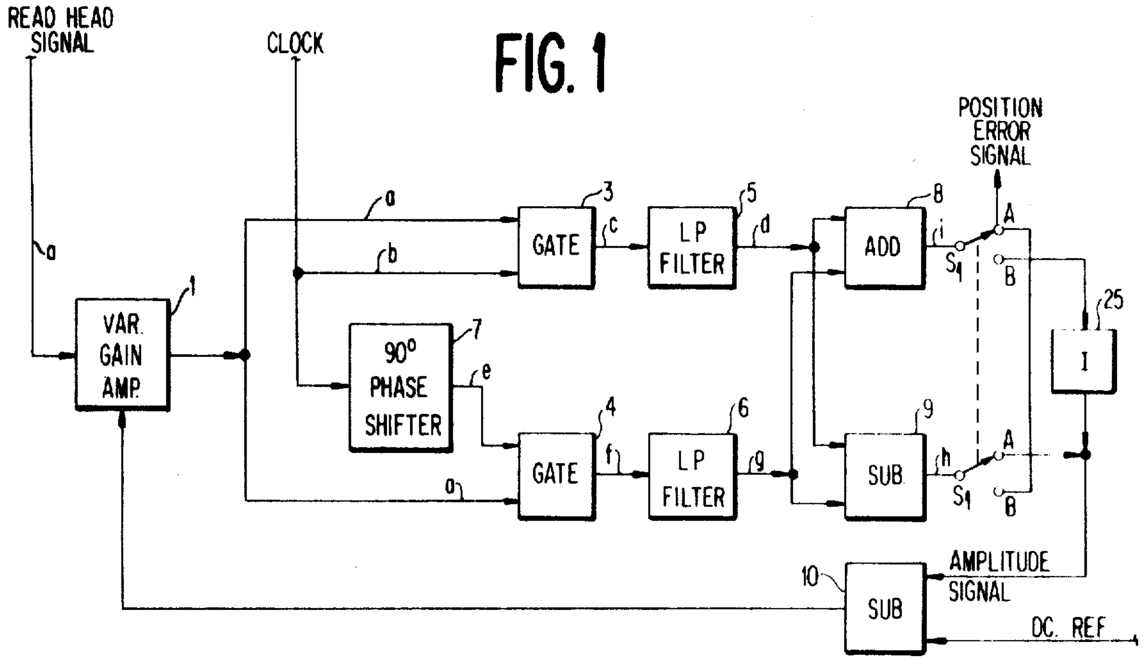
FIG. 1 shows the preferred embodiment of the error positioning system and the automatic gain control system.

FIG. 1 shows a detailed block diagram of the position error detection circuitry and for the variable gain control circuitry of the positioning circuitry of the track following servosystem. All of the circuit elements used within the positioning detector of the track following servosystem, that is variable gain amplifier 1, 90° phase shifters 7, gates 3 and 4, low pass filters 5 and 6, analog adder circuitry 8, analog subtractor circuitry 9 and 10, and inverter 25 are all well known in the art and can be found in the texts *Pulse and Digital Circuits*, Millman and Taub, McGraw-Hill, 1959 and *Analog Computation*, A. S. Jackson, McGraw-Hill, 1960. The cited circuit elements are interconnected as shown in FIG. 1 and it is within the skill of the art having FIG. 1 to physically interconnect the forementioned circuit elements as shown in FIG. 1.

Figure 3:
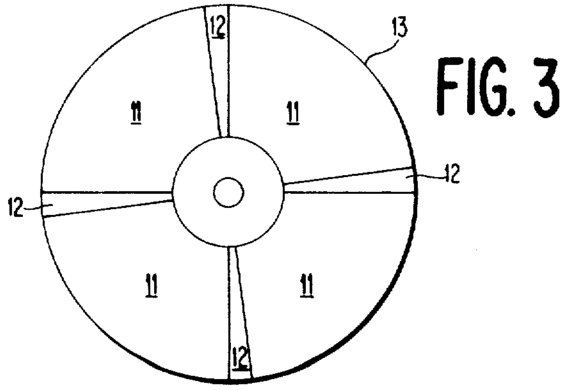
FIG. 3 is a schematic representation of a magnetizable disc showing the relative positions of reference patterns and data selectors.

FIG. 3 shows a magnetic disc 13 which is well known in the art. Magnetic disc 13 is divided into positioning sectors 12 and information sectors 11.

Figure 2:
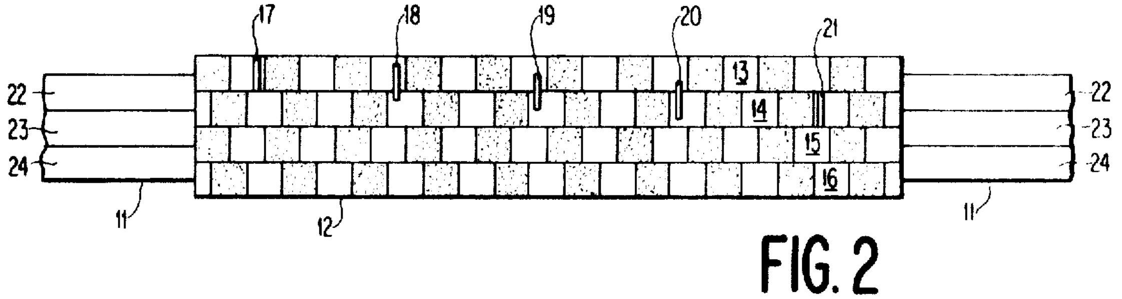
FIG. 2 shows the relationship between reference tracks and data tracks in the relationship between the signal-inducing areas of adjacent reference tracks.

FIG. 2 shows the relationship between servo tracks 13, 14, 15 and 16 of a positioning sector 12 with information tracks 22, 23, 24 of bounding information sectors 11. The servo tracks 13, 14, 15 and 16 are used to specify the center of information tracks 22, 23 and 24. It can be seen that the boundary between servo tracks 13 and 14 is equal to the center of information track 22. In similar manner, servo tracks 14 and 15 specify the center of information track 23 and servo tracks 15 and 16 specify the center of information track 24. Each of the servo tracks 13, 14, 15 and 16 is comprised of a series of signal inducing representations where the shaded areas designate a signal inducing area of a first polarity and the unshaded area represents the signal inducing area of the opposite polarity. The signal inducing areas of each of the servo tracks 13, 14, 15 and 16 generate an induced signal into the transducer of the same frequency. It should further be noted, however, that the signal induced by the even number servo tracks will be 90° out of phase with the signal induced by the odd number servo tracks. The servo tracks 13, 14, 15 and 16 have a width equal to the working area of the transducers 17, 18, 19, 20 or 21. The transducers 17, 18, 19, 20 and 21 are shown so as to represent five positions which in normal use a single transducer might take with respect to servo tracks 13 and 14 during the normal operation of the servo positioning system. In the discussion of the positioning error detection system, each transducer 17, 18, 19, 20 and 21 will be treated separately for ease of description. However, in normal operation only one transducer would be used.

FIG. 1 shows the positioning detector having a sync clock input which is made available to the positioning detector only when the transducer is reading in the positioning sectors 12. Applicant will not go into detail as to how this may be accomplished as it is well known in the art as exemplified by U.S. Pat. No. 3,185,972, "Transducer Positioning System Utilizing Records with Interspersed Data and Positioning Information." The sync clock input signal is connected to gate 3 and the 90° phase shifter 7. The output of the transducer is inputted to the variable gain amplifier 1. The output of adder 8 is the position error signal which is fed to the servosystem for positioning the transducer with respect to the center of the desired information track. A DC reference level is inputted to subtractor 10 to set the reference level for the variable gain amplifier 1 such that correct positioning error signals may be generated by the positioning detector of the positioning servosystem.

OPERATION OF THE PREFERRED EMBODIMENT

For ease of understanding two assumptions will be made in the discussion of the operation of the preferred embodiment. The first assumption is that it is desirable to center the transducer on the center of information track 22 in information sectors 11 and that the transducer head has already been located within the confine of transducer 17 and transducer 21 as shown in FIG. 2. The second assumption is that the sync clock signal is synced to the servo signals of the odd numbered servo tracks of the positioning sectors 12 as shown in FIG. 2.

As disc 13 is rotated a readhead will read the information that is recorded in information areas 11 and the servo information recorded in information sectors 12. As the readhead enters an information sector 12, the sync clock signal will be made available to the 90° phase shifter 7 and gate 3 of the positioning detector. The output of the read-head is inputted to the variable gain amplifier 1 whose output is fed into gates 3 and 4. Gate 3 is sampled by the sync clock signal and gate 4 is sampled by the sync clock signal which was shifted in 90° by the 90° phase shifter 7. The output of gate 3 is fed into an averaging low pass filter 5. The output of gate 4 is fed into the averaging low pass filter 6. Analog adder circuitry 8 combines algebraically the output of low pass filters 5 and 6 to provide a positioning error signal that is indicative of the position of the transducer to the center of information track 22 as dictated by the boundary condition between servo tracks 13 and 14 of the positioning sector 12. The analog subtractor circuit 9 subtracts algebraically the output of low pass filter 5 and 6 to obtain an amplitude signal which is indicative of the amplitude of the readhead signal read by the transducer. Subtractor circuitry 10 compares the amplitude signal from analog subtractor 9 with a DC reference level to produce an automatic gain control signal for the variable gain amplifier 1. It should be noted that the output of analog subtractor 9 is independent of the position of the transducer with respect to the center of information track 22 as dictated by the boundary between servo tracks 13 and 14 of positioning sectors 12.

Figure 4:
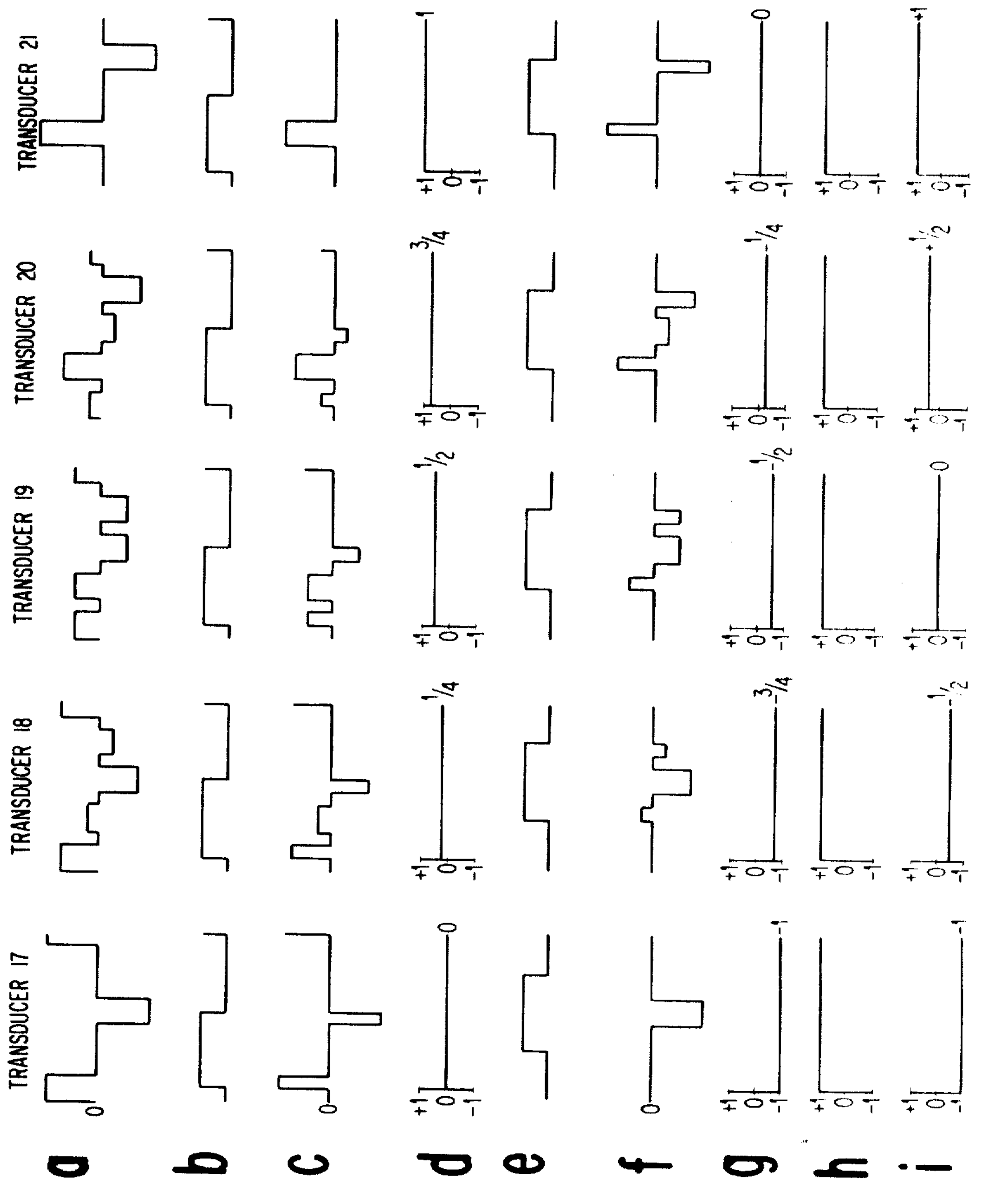
FIG. 4 shows a plurality of waveforms for the preferred embodiment of FIG. 1 for five different positions of the transducer with respect to the center line of the desired data track.

This can more clearly be seen by referring to FIG. 4 which shows the waveforms associated with the positioning detector for the transducer heads 17, 18, 19, 20 and 21 which are the range of the transducer position that normally will occur.

With reference to FIG. 4 and the waveforms associated with transducer head 17 which is associated with the transducer being one-half a track width off center from the desired information track 22. Waveform *a* shows the ideal waveform read by transducer 17. Waveform *b* is the sync clock waveform which is inputted to gate 3 and the 90° phase shifter 7. Waveform *c* shows the output of gate 3 which was sampled by waveform *b* of input signal *a*. Waveform *d* shows the DC signal which is the output of the low pass filter 5. It should be noted that in this example, the DC value is 0 since the positive portion of waveform *c* is equal to the negative portion of waveform *c*. Waveform *e* shows the output of the 90° phase shifter 7 which is the sync clock signal shifter by 90°. Waveform *f* is the output of gate 4, which is that portion of the input signal *a* that was sampled by waveform *e*. Waveform *g* shows the output of the averaging low pass filter 6. In the instant example, the value is designated as −1 which is a maximum negative value since only the negative portion of the input waveform *a* exists in the output of gate 4 which is waveform *f*. Waveform *h* is the output of analog subtractor circuitry 9 which is equal to the algebraic difference of waveforms *d* and *g* where the output equals $d-g$. Therefore, in the instant example, the output of analog subtractor circuitry 9 is equal to +1 since $(0)-(-1)$ equals +1. Waveform *i* shows the output of analog adder circuitry 8 which is the position error signal to the servo system for correcting the position of the transducer inputting the original signal *a* into the positioning error detection system. The output of analog adder 8 is the algebraic sum of waveforms *d* and *g*, $d+g$. Therefore, the output of adder circuitry 8 in the instant example is equal to −1, since $(0)+(-1)$ equals −1.

The output of analog subtractor circuitry 9 is fed into analog subtractor circuitry 10 and compared with a DC reference to produce an automatic gain control signal through the variable gain amplifier 1 such that the output of the analog subtractor circuitry 9 will be equal to the DC reference to subtractor circuitry 10.

Now referring to FIG. 4 and the waveforms associated with transducer 18, waveform *a* shows the input waveform through variable gain amplifier 1. It should be noted that the waveform *a* is a function of the transducer's position with respect to servo tracks 13 and 14. Since the head 18 has now crossed the boundary division between servo tracks 13 and 14, it will receive a smaller signal from track 13 then did head 17 in the preceding example, but will receive a greater signal from track 14 than was induced into head 17 in the preceding example. Once again waveform *b* is the sync clock signal inputted to gate 3. Waveform *c* is the output of the gate 3 and is that portion of waveform *a* that was sampled by waveform *b*. The output of the averaging or smoothing low pass filter 5 is shown as waveform *d* and is indicated to be one-fourth units. As can be seen from waveform *c*, the narrow positive pulse will cancel out the narrow negative pulse leaving the wider positive pulse to be effectively distributed over the period of the sampling waveform *b* by the smoothing low pass filter 5. Waveform *f* is the output of gate 4 which occurs by the sampling of waveform *a* by the 90° phase shifted signal *b*.

The output of the smoothing low pass filter 6 is shown by waveform *g* to be a DC value of −¾ units. The value of the waveform *g* is obtained by averaging waveform *f* over the sampling period as defined by the sync clock signal *b*. Waveform *h* is the output of analog subtractor circuitry 9 which is equal to +1 since $d-g=(\frac{1}{4})-(-\frac{3}{4})=+1$. The output of analog adder circuitry 8 is waveform *i* which is equal to −½ since $d+g=(\frac{1}{4})-(-\frac{3}{4})=-\frac{1}{2}$.

Therefore, it can be seen that the output of analog subtractor circuitry 9 is a constant in the absence of electrical noise or in the absence of some degradation to the signals read by the transducer.

TABLE I

| | ½ track transducer 17 | ¼ track transducer 18 | ON track transducer 19 | ¼ track transducer 20 | ½ track transducer 21 |
|---|---|---|---|---|---|
| $d$ | 0 | +¼ | +½ | +¾ | +1 |
| $g$ | −1 | −¾ | −½ | −¼ | 0 |
| $h=d-g$ | +1 | +1 | +1 | +1 | +1 |
| $i=d+g$ | −1 | −½ | 0 | +½ | +1 |

Table I is a summary of the operation of the positioning detector at the various track positions as indicated in FIG. 2 by heads 17, 18, 19, 20 and 21. It should be noted that the value of *h* is a constant regardless of the head position with reference to the center of the desired information track in the absence of electrical noise or some other degradation of the input signal. If there was electrical noise or degradation of the input signal, the value of *h* would not be constant but would produce an input for the variable gain amplifier 1 by means of comparison of the output of subtractor circuitry 9 with the DC reference input 2 by analog subtractor circuitry 10, to provide a signal which would produce a constant value of +1 for the output of analog subtractor circuitry 9. Waveform *i* is the position error signal which is shown to range from −1 to +1 with a 0 value when the transducer is on the center of the desired information track as shown by transducer 19 of FIG. 2. It is well known in the art that having a signal that is indicative of the position of a transducer with reference to a boundary condition, allows the use of servo equipment to center the transducer to a desired position with respect to that boundary condition. What actual servomechanisms are used to servo or move the transducer in question is not part of the present invention.

Again, it should be stressed and noted that even though a 0 positioning error signal is generated when the transducer is on track, a signal is generated as to the amplitude of the signals being read by the transducer such that the input to the variable gain amplifier can be correct so as to provide signals for gates 3 and 4 such that proper and correct position error signals may be therein generated.

The value shown in Table I for *d*, *g*, *h* and *i* can be found by viewing the waveforms associated with heads 19, 20 and 21 on FIG. 4.

It, therefore, can be seen that by sampling the readhead signal in overlapping time intervals, allows the generation of not only a correct position error signal but also an amplitude signal that is indicative of the amplitude being read by the readhead signal and for allowing the automatic gain control to be efficiently incorporated in the positioning detection circuitry.

TABLE II

| | ½ track transducer 17 | ¼ track transducer 18 | ON track transducer 19 | ¼ track transducer 20 | ½ track transducer 21 |
|---|---|---|---|---|---|
| $d$ | −1 | −¾ | −½ | −¼ | 0 |
| $g$ | 0 | −¼ | −½ | −¾ | −1 |
| $h=d-g$ | −1 | −½ | 0 | +½ | +1 |
| $i=d+g$ | −1 | −1 | −1 | −1 | −1 |

If the sync clock signal was synced to the even number servo tracks within the positioning sectors 12 of disc 13, then the resulting corresponding values for waveforms *d*, *g*, *h* and *i* that would be obtained is shown in Table II. By comparing the values for waveforms *h* and *i* in Tables I and II, it can be seen that under these conditions, waveform *h* indicates the positioning error signal and waveform *i* would indicate the negative of the amplitude signal. Applicant has, therefore, incorporated switch S1 which would allow the positioning error signal to be obtained from analog adder circuitry 8 and the amplitude signal to be obtained from analog subtractor circuitry 9 when the sync clock signal is synced to the odd number servo tracks in the positioning sectors 12 of disc 13, i.e., that is, switch S1 is in position A. However, when the sync clock signal is synced to the even number servo tracks within positioning sectors 12 of magnetic disc 13, then the position error signal is obtained from analog subtractor circuitry 9 and the amplitude signal is received from the output of inverter 24, which inverts the output of analog adder circuitry 8 to provide proper polarity of the amplitude signal to analog subtractor circuitry 10, i.e., switch S1 is in position B.

What I claim is:

1. A memory system comprising:

a magnetic disc having a plurality of positioning control sectors interspersed with a plurality of information sectors, each of said positioning control sectors having a plurality of concentric reference tracks, each said reference track having a series of signal inducing areas defining a signal of frequency *f*, the boundary between adjacent ones of said reference track defining the centers of data tracks in said information sectors;

a transducer adjacent to and movable with respect to said magnetic disc, said transducer being responsive to the magnetic states of both said reference track in said positioning control sectors and said data tracks in said information sectors;

a variable gain amplifier for receiving said signals developed from said reference tracks by said transducer;

a first sampling means for sampling the output of said variable gain amplifier at a first frequency;

a second sampling means for sampling the output of said variable gain amplifier at a second frequency, where said first and said second frequencies are the same frequencies but 90° out of phase with respect to each other;

a first converting means connected to said first sampling means for generating a first analog signal proportional to the output of said first sampling means;

a second converting means connected to the output of said second sampling means for generating a second analog signal proportional to the output of said second sampling means;

a first generating means for generating a position error signal from said first and second analog signals, said position error signal being indicative of the position relationship between said transducer and two of said reference tracks in said positioning control sectors;

a second generating means for generating an amplitude signal from said first and second analog signals, said amplitude signals being indicative of the amplitude of the signals being developed from said reference tracks by said transducer;

a third generating means for generating a variable gain amplifier control signal by comparing said amplitude signal and a given reference signal, the output of said third generating means being connected to said variable gain amplifier for controlling the gain of said variable gain amplifier.

2. A memory system as set forth in claim 1 wherein said transducer has a working area equal to the width of a reference track, all of said reference tracks having the same width.

3. A memory system as set forth in claim 2 wherein said series of signal inducing areas of the even numbered reference tracks are offset by 90° as defined by said frequency *f* from the series of signal inducing areas in the odd number reference tracks in each of said positioning control sectors.